United States Patent
Geva et al.

(10) Patent No.: US 7,436,808 B2
(45) Date of Patent: Oct. 14, 2008

(54) METHOD AND APPARATUS FOR BANDWIDTH RESERVATIONS

(75) Inventors: Erez Geva, Tel Aviv (IL); Oded Shaashua, Tel Aviv (IL); Gonen Ziv-Av, Tel-Mond (IL)

(73) Assignee: Lucent Technologies Inc., Murray Hill, NJ (US)

( * ) Notice: Subject to any disclaimer, the term of this patent is extended or adjusted under 35 U.S.C. 154(b) by 1435 days.

(21) Appl. No.: 10/313,677

(22) Filed: Dec. 6, 2002

(65) Prior Publication Data

US 2003/0137967 A1 Jul. 24, 2003

(30) Foreign Application Priority Data

Dec. 17, 2001 (EP) .................................. 01310536

(51) Int. Cl.
*H04B 7/212* (2006.01)
*H04J 3/00* (2006.01)

(52) U.S. Cl. ................. 370/337; 370/347; 370/280; 370/348; 455/423; 455/445

(58) Field of Classification Search ............... 370/337, 370/336, 347, 348, 280
See application file for complete search history.

(56) References Cited

U.S. PATENT DOCUMENTS 5,307,349 A * 4/1994 Shloss et al. ............... 370/442
5,353,285 A * 10/1994 Van Der Plas et al. ...... 370/443
5,638,371 A * 6/1997 Raychaudhuri et al. .. 370/310.2
5,963,541 A 10/1999 Koga et al. ................. 370/229
5,970,062 A * 10/1999 Bauchot .................. 370/310.2
6,493,352 B1 * 12/2002 Mawhinney et al. ........ 370/458
6,535,501 B1 * 3/2003 Bohnke ..................... 370/345
6,567,383 B1 * 5/2003 Bohnke ..................... 370/280
6,760,305 B1 * 7/2004 Pasternak et al. ........... 370/230
6,813,252 B2 * 11/2004 Chang et al. ............... 370/294
6,925,072 B1 * 8/2005 Grohn ....................... 370/336
6,987,753 B2 * 1/2006 Liu et al. ................... 370/348
7,006,529 B2 * 2/2006 Alastalo et al. ............ 370/468
7,164,697 B1 * 1/2007 Beser ........................ 370/485
7,218,936 B2 * 5/2007 Rinne et al. ................ 455/447

FOREIGN PATENT DOCUMENTS

EP 0 544 975 A1 12/1991

* cited by examiner

*Primary Examiner*—Marceau Milord

(57) ABSTRACT

A transmitting unit for use in sending data in packets in timeslots within time frames, each packet being sent in a timeslot, the unit comprising means to reserve for uplink transmission in the next uplink time frame a number of timeslots (X), the number of timeslots (X) being determined dependent upon a value which is the number of timeslots (Y) used for uplink transmission in the previous uplink time frame plus the number of packets (Z) remaining for uplink transmission during the last time frame minus the number of time slots (Q) to be used in the present uplink time frame.

5 Claims, 1 Drawing Sheet

METHOD AND APPARATUS FOR BANDWIDTH RESERVATIONS

CROSS REFERENCE TO RELATED APPLICATION

This application claims priority of European Application No. 01310536.6 filed on Dec. 17, 2001.

FIELD OF THE INVENTION

The present invention relates to a transmitting unit for use in sending data in packets in timeslots within time frames and a method of data transmission involving bandwidth reservation, in particular reservation of timeslots.

BACKGROUND OF THE INVENTION

In known time division protocols, a number of time slots per time frame are allocated to a modem to be used for voice or video. The disadvantage is that there must be means to calculate the number of timeslots, and it might allocate too many, causing bandwidth to be wasted, or too few, causing delay in transmission of the packets. In those known systems on the uplink, a packet waits two time intervals for transmission, one interval being for a timeslot to be requested, the second being for allocation of uplink timeslots by the access point of the core network; the access point can be considered as a master modem controlling communications with slave modems.

SUMMARY OF THE INVENTION

The present invention provides a transmitting unit for use in sending data in packets in timeslots within time frames, each packet being sent in a timeslot, the unit comprising means to reserve for uplink transmission in the next uplink time frame a number of timeslots, the number of timeslots being determined as the number of timeslots used for uplink transmission in the previous uplink time frame plus the number of packets remaining for uplink transmission during the last time frame minus the number of time slots to be used in the present uplink time frame.

The present invention in its advantageously addresses the problem of delay in known time division wireless systems on the uplink. The present invention seeks when possible to effectively eliminate the above-mentioned first interval in which to request a timeslot, and is particularly suitable for voice and/or video data.

The present invention has advantages of simple implementation, and low processing power (CPU) and memory requirements. In many cases the delay in packet transmissions on the uplink is cut in half.

The present invention may be advantageously a modem. Advantageously the modem, within three or four time frames, tends to reserve only the same number of time slots as used in the last uplink time frame. The process is adaptive in that the modem "learns" the current bandwidth (number of time slots) and the result of this adaption is reduced packet delay.

Advantageously, the number of time slots (X) reserved is said value.

Advantageously, the number of time slots (X) reserved is the largest of the values determined in a plurality of uplink time frames up to the present uplink time frame and stored in a memory.

The present invention also provides a network comprising the transmitting unit, and a receiving unit operative to transmit to the transmitting unit information of time slots allocated in the next uplink frame and to receive the packets sent by the transmitting unit.

The present invention also provides a method of sending data in packets in timeslots within time frames, each packet being sent in a timeslot, the method comprising reserving for uplink transmission in the next uplink time frame a number of timeslots (X), the number of timeslots (X) being determined dependent upon a value which is the number of timeslots (Y) used for uplink transmission in the previous uplink time frame plus the number of packets (Z) remaining for uplink transmission during the last time frame minus the number of time slots (Q) to be used in the present uplink time frame.

BRIEF DESCRIPTION OF THE DRAWING

The present invention will be better understood from reading the following description of non-limiting embodiments, with reference to the attached drawings, wherein below.

Figure 1:
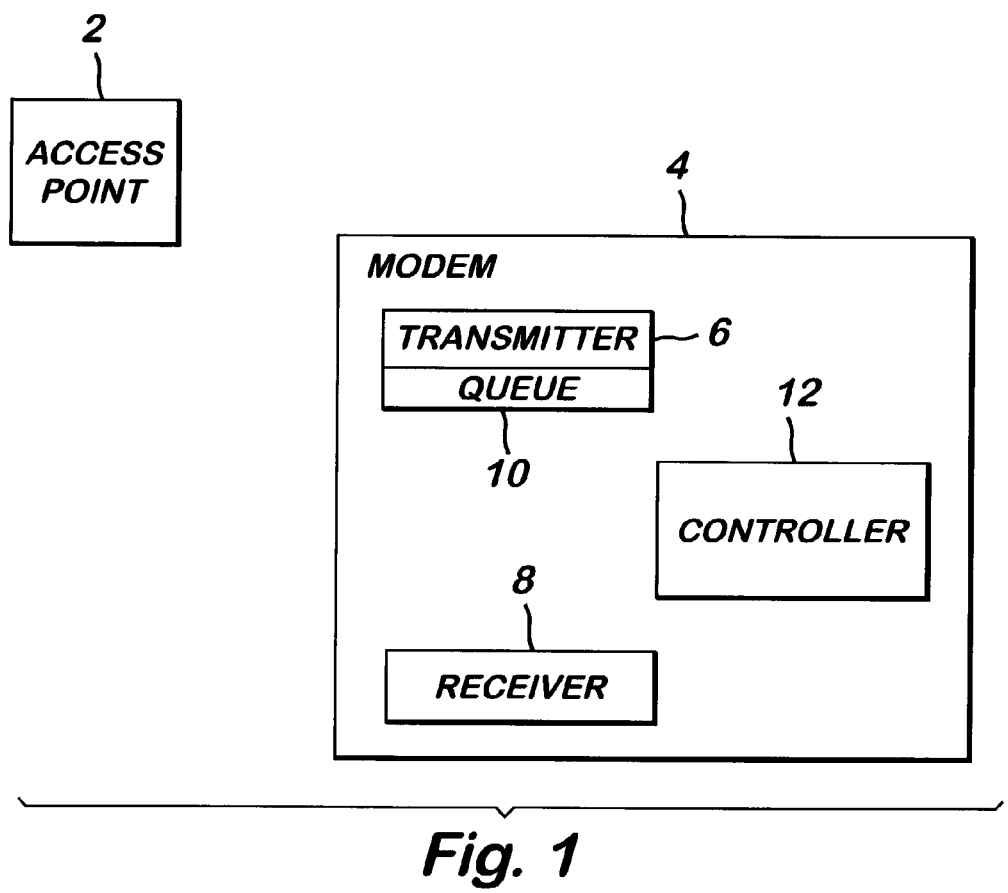
FIG. 1 depicts an embodiment of the present invention.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

For voice traffic over external wireless data (XWD) systems, delay should be minimized. The inventors realized that, and that a voice call requires approximately constant bandwidth on both uplink and downlink, so it was found possible to use information of the number of timeslots used in the previous uplink timeframe when allocating slots for the next uplink timeframe.

System Structure

As shown in FIG. 1, the system consists of an access point 2 and a modem 4 for time division wireless communication to the access point 2. The access point is a master modem through which transmissions from the modem 4 are routed, hence it is the access point to the rest of the telecommunications world (also known as the core network). The modem 4 includes a transmitter 6 and receiver 8. The transmitter includes a memory 10 in which unsent packets are queued to be transmitted. The modem 2 includes a controller 12, which controls which timeslots to be used for uplink transmission in each uplink time frame. The controller 12 is informed by the access point 2 which timeslots of each time frame are allocated to the modem 4 for uplink communication. The modem 4 can thus be considered as a slave to the access point 2 in this regard.

Let us assume that voice packets are sent in 10 millisecond timeslots in both directions, uplink and downlink, and consider one Wireless Modem (WM) data stream. It will be seen that there is a time frame for downlink followed by a time frame for uplink and so on, i.e. the uplink and downlink time frames alternate. The packets arrive from an Ethernet cable (not shown) and are transmitted by the modem 4 to the access point 2. Two new packets arrive during each time frame.

Comparative Example

In each uplink timeframe, the modem 4 is allocated by the access point 2 the full bandwidth, i.e. all the time slots which it requested (reserved) for this timeframe in the previous uplink transmission. In situations where more timeslots are reserved than the number of packets to be transmitted, the extra timeslots are unused (i.e. the bandwidth is wasted) although in some embodiments the wireless modem can use it for other tasks if it has any.

The number of time slots M reserved in each (uplink) time frame is the number of packets N remaining for transmission from the previous time frame (before the packets of the current time frame arrive for transmission) minus the number P of packets that are being transmitted in the current time frame.

used to transmit in the previous uplink time frame, plus the number of remaining packets Z of the previous downlink time frame, minus the number of timeslots used (packets sent) Q in the present uplink time frame. An example is shown in Table 2 below.

It will be seen in Table 2 that from the $7_{th}$ time frame onwards there is a delay of only one or two time frames between a packet arriving and being transmitted.

In the advantageous scheme the pattern of delay between arrival and transmission is not initially constant but becomes constant over a period, which includes four to five uplink time frames. This could take about 30 milliseconds. Therefore in a further embodiment of the invention a history is kept of the number of time slots required per time frame longer than just than number used in the last uplink time frame.

In the modem according to said further embodiment, each voice packet arriving, which is acceptable to be transmitted in the next uplink time frame, is counted in a counter. When the modem gets bandwidth i.e. timeslots for uplink transmission in the current time frame, a record of the number of timeslots allocated per time frame is stored in an array holding the latest 8 values, and the counter rezeroed. In each time frame, a check is made whether a poll signal has been received from a) TABLE 1

| Time Frame Number | No. of timeslots RESERVED in this time frame M | No. of packets TRANSMITTED in this time frame P | Total transmitted packets | Total arrived packets | No. of Remaining packets | No. of Remaining packets of Previous time frame N | Time frames in which transmitted packets arrived |
|---|---|---|---|---|---|---|---|
| 1 | 0 | 0 | 0 | 2 | 2 | | |
| 2 | Downlnk | downlnk | 0 | 4 | 4 | 2 | |
| 3 | 4 | 0 | 0 | 6 | 6 | 4 | |
| 4 | Downlnk | downlnk | 0 | 8 | 8 | 6 | |
| 5 | 4 | 4 | 4 | 10 | 6 | 8 | 1,2 |
| 6 | Downlnk | downlnk | 4 | 12 | 8 | 6 | |
| 7 | 4 | 4 | 8 | 14 | 6 | 8 | 3,4 |
| 8 | Downlnk | downlnk | 8 | 16 | 8 | 6 | |
| 9 | 4 | 4 | 12 | 18 | 6 | 8 | 5,6 |
| 10 | Downlnk | downlnk | 12 | 20 | 8 | 6 | |
| 11 | 4 | 4 | 16 | 22 | 6 | 8 | 7,8 |

Notes to Table 1:

(a) The packets of a time frame arrive after reservation is made so they are not counted in the number of timeslots (packets) reserved in that time frame.

(b) The number of packets reserved in a time frame is the Wireless Modem reservation from the access point 2. This is included in the downlink signalling included in each downlink packet (and known as the piggy).

(c) The remaining packets are the number of packets which are left in the to be transmitted queues at the end of the time frame.

It will be seen in Table 1 that there is a constant delay of 3 to 4 time frames.

The Advantageous Scheme

An advantageous scheme is to reserve for the next uplink time frame a number X of time slots which is the number Y the access point 2 and if not received, in every even numbered (i.e. downlink) time frame the count is taken to be zero. This mechanism yields a history of the time slot allocations for time frames numbered n to 2n, where n is greater than or equal to 0 and is less than or equal to 8. The maximum number of time slots from the history is included in the reservation request sent to the access point 2.

TABLE 2

| Time Frame No. | No. of timeslots RESERVED in this time frame X | No. of packets TRANSMITTED in this time frame Q | No. of packets TRANSMITTED in PREVIOUS time frame Y | Total transmitted packets | Total arrived packets | No. of Remaining packets | No. of Remaining packets in previous time frame Z | Time frames in which transmit. packets arrived |
|---|---|---|---|---|---|---|---|---|
| 1 | 0 | 0 | 0 | 0 | 2 | 2 | 0 | |
| 2 | Downlnk | Downlnk | downlnk | 0 | 4 | 4 | 2 | |
| 3 | 4 | 0 | 0 | 0 | 6 | 6 | 4 | |
| 4 | Downlnk | Downlnk | downlnk | 0 | 8 | 8 | 6 | |
| 5 | 4 | 4 | 0 | 4 | 10 | 6 | 8 | 1,2 |
| 6 | Downlnk | Downlnk | downlnk | 4 | 12 | 8 | 6 | |
| 7 | 8 | 4 | 4 | 8 | 14 | 6 | 8 | 3,4 |
| 8 | Downlnk | Downlnk | downlnk | 8 | 16 | 8 | 6 | |
| 9 | 4 | 8 | 4 | 16 | 18 | 2 | 8 | 5,6,7,8 |
| 10 | Downlnk | Downlnk | downlnk | 16 | 20 | 4 | 2 | |
| 11 | 8 | 4 | 8 | 20 | 22 | 6 | 4 | 9,10 |
| 12 | Downlnk | Downlnk | downknk | 20 | 24 | 4 | 6 | |
| 13 | 4 | 4 | 4 | 24 | 26 | 2 | 4 | 11,12 |
| 14 | Downlnk | Downlnk | downlnk | 24 | 28 | 4 | 2 | |
| 15 | 4 | 4 | 4 | 28 | 30 | 2 | 4 | 13,14 |

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as network elements, the wireless unit, the base station, a base station controller, a mobile switching center and/or a radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

We claim:

1. A transmitting unit for sending data in packets in timeslots within time frames, each packet being sent in a timeslot, the unit comprising means to reserve for uplink transmission in the next uplink time frame a number of timeslots, and means for determining said number of timeslots being determined as the number of timeslots used for uplink transmission in the previous uplink time frame plus the number of packets remaining for uplink transmission during the last uplink time frame minus the number of time slots to be used in the present uplink time frame.

2. A transmitting unit according to claim 1, which is a modem.

3. A transmitting unit according to claim 2, which is a wireless modem, the packets being sent by radio.

4. A network comprising the transmitting unit according to claim 1, and a receiving unit operative to transmit to the transmitting unit information of time slots allocated in the next uplink frame and to receive the packets sent by the transmitting unit.

5. A method of sending data in packets in timeslots within time frames, each packet being sent in a timeslot, the method comprising reserving for uplink transmission in the next uplink time frame a number of timeslots, said number of timeslots being determined as the number of timeslots used for uplink transmission in the previous uplink time frame plus the number of packets remaining for uplink transmission during the last uplink time frame minus the number of time slots to be used in the present uplink time frame.

* * * * *